(12) United States Patent
Hangsleben

(10) Patent No.: US 10,082,835 B2
(45) Date of Patent: Sep. 25, 2018

(54) ELECTRONIC DEVICE HOUSINGS INCLUDING DEFORMATION CHANNELS

(71) Applicant: Dave W. Hangsleben, Las Vegas, NV (US)

(72) Inventor: Dave W. Hangsleben, Las Vegas, NV (US)

(73) Assignee: Hank Technology LLC, Grand Forks, ND (US)

( * ) Notice: Subject to any disclaimer, the term of this patent is extended or adjusted under 35 U.S.C. 154(b) by 0 days.

(21) Appl. No.: 15/419,157

(22) Filed: Jan. 30, 2017

(65) Prior Publication Data

US 2017/0220073 A1    Aug. 3, 2017

Related U.S. Application Data

(60) Provisional application No. 62/388,450, filed on Feb. 1, 2016.

(51) Int. Cl.
G06F 1/16    (2006.01)
H04M 1/18   (2006.01)

(52) U.S. Cl.
CPC .......... G06F 1/1656 (2013.01); G06F 1/1626 (2013.01); *G06F 2200/1633* (2013.01); *H04M 1/185* (2013.01)

(58) Field of Classification Search
CPC ................. G06F 1/1656; G06F 1/1626; G06F 2200/1633; H04M 1/185
USPC .................................................... 361/679.55
See application file for complete search history.

(56) References Cited

U.S. PATENT DOCUMENTS

| | | | |
|---|---|---|---|
| 5,586,002 A * | 12/1996 | Notarianni | G06F 1/1626 248/920 |
| 8,373,975 B2 | 2/2013 | Liang et al. | |
| 8,373,980 B2 | 2/2013 | Reber | |
| 8,439,191 B1 | 5/2013 | Lu | |
| 8,457,701 B2 * | 6/2013 | Diebel | H04B 1/3888 206/701 |
| 8,995,126 B2 | 3/2015 | Rayner | |
| 9,107,299 B2 | 8/2015 | Rayner | |
| 9,125,297 B2 | 9/2015 | Magness | |
| 9,143,181 B1 | 9/2015 | Jia et al. | |

(Continued)

FOREIGN PATENT DOCUMENTS

DE        202014008506        2/2015

OTHER PUBLICATIONS kensington.com, "SafeGrip Security Case & Lock for iPad", Retrieved from URL: http://www.kensington.com/us/us/4511/k67794am/safegrip-security-case-lock-for-ipad#.VoQ-ovkrLbh, Also located at URL: http://manualsbrain.com/en/manuals/335540/pdf/6e4a85dbf9b35b058c6ad9d215f825a8633352e2012f26c9732d9ce8b-a6c896c/kensington-safegrip-security-case-lock-for-ipad-sunshine-k67794am-leaflet.pdf, Retrieved on Dec. 20, 2015, 1 page.

(Continued)

*Primary Examiner* — Hoa C Nguyen
*Assistant Examiner* — Keith Depew
(74) *Attorney, Agent, or Firm* — Brooks, Cameron & Huebsch, PLLC

(57) ABSTRACT

Electronic device housings including deformation channels can, for example, include a rigid exterior member (REM) and a semi-rigid interior member (SRIM) disposed within an internal volume of the REM and including a cavity to house an electronic device, where the SRIM includes shock adsorbing spacers projecting from a main body of the SRIM to form a deformation channel between the REM and the main body of the SRIM.

20 Claims, 10 Drawing Sheets

(56) References Cited

U.S. PATENT DOCUMENTS

| | | | |
|---|---|---|---|
| 9,578,940 B2* | 2/2017 | Burgess | A45C 11/00 |
| 9,798,361 B2* | 10/2017 | Kim | G06F 1/187 |
| 2002/0043608 A1* | 4/2002 | Nakata | F16F 1/025 |
| | | | 248/560 |
| 2007/0014087 A1* | 1/2007 | Kwak | G06F 1/187 |
| | | | 361/679.33 |
| 2007/0230106 A1* | 10/2007 | Yeh | G06F 1/187 |
| | | | 361/679.33 |
| 2011/0267551 A1* | 11/2011 | Yokote | G06F 1/1643 |
| | | | 348/836 |
| 2012/0037524 A1* | 2/2012 | Lonsdale, II | G06F 1/1626 |
| | | | 206/320 |
| 2012/0261289 A1* | 10/2012 | Wyner | A45C 11/00 |
| | | | 206/320 |
| 2013/0100591 A1* | 4/2013 | Montevirgen | G11B 33/08 |
| | | | 361/679.01 |
| 2014/0226268 A1* | 8/2014 | O'Neill | G03B 15/06 |
| | | | 361/679.01 |
| 2014/0262847 A1 | 9/2014 | Yang | |
| 2016/0192751 A1* | 7/2016 | Corcoran | A45C 11/00 |
| | | | 224/245 |

OTHER PUBLICATIONS displays2go.com, "iPad Wall Mount, Locking Enclosure w/Exposed Home, Bracket for CC Reader—White", Retrieved from http://www.displays2go.com/P-21611/Wall-Mount-Tablet-Has-A-Locking-Enclosure? st=Category&sid=28495, Retrieved on Dec. 20, 2015, 2 pages.

* cited by examiner

ELECTRONIC DEVICE HOUSINGS INCLUDING DEFORMATION CHANNELS

CROSS-REFERENCE TO RELATED APPLICATION

This application claims priority to U.S. Provisional Application No. 62/388,450 filed on Feb. 1, 2016, the entire contents of which is herein incorporated by reference.

BACKGROUND

Electronic devices such as phones, computers, and/or tablets, among other electronic devices, can enable electronic communication between individuals. For example, inmates housed in penal institutions can use electronic communications to communicate with visitors. For instance, an electronic device can permit a visitor to interact with an inmate housed in penal institution while the visitor is at the penal institution and/or while the visitor is remotely located from the penal institution.

DETAILED DESCRIPTION

Figure 1:
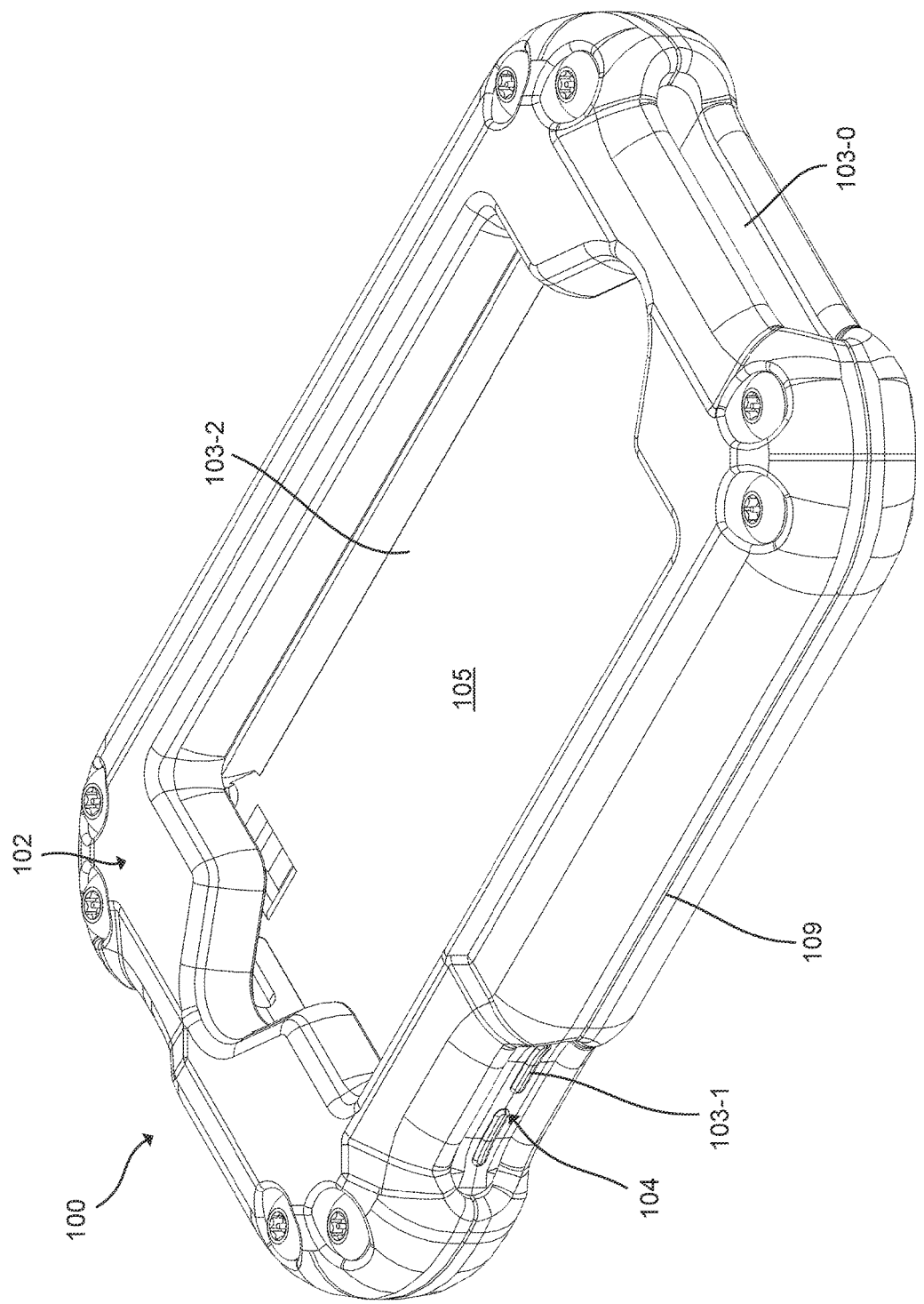
FIG. 1 illustrates an example of a housing in accordance with the disclosure.

Communications between inmates and visitors are widely used by a variety of incarceration facilities. An incarceration facility refers to a location housing inmates. Examples of incarceration facilities include prisons and/or jails, among other types of incarceration facilities. An inmate refers to an incarcerated person, for instance, those in an incarceration facility. An incarceration facility such as a prison may allow electronic communication between an inmate and a visitor. As used herein, a visitor refers to a family member, significant other, friend, and/or legal representative of an inmate, among other visitors that may communicate electronically with an inmate.

Electronic devices such as phones, computers, and/or tablets, among other electronic devices, can enable inmates housed in incarceration facilities to communicate electronically with visitors. Examples of electronic communications include electronic voice communications (i.e., an audio call), video communications (i.e., a video call), and/or text based communications (e.g., texting, etc.) with visitors, among other types of electronic communications.

As such, an electronic communication device can permit a visitor to communicate with an inmate housed in an incarceration facility while the visitor is at the incarceration facility and/or while the visitor is remotely located from the incarceration facility. However, electronic communication devices may be subject to damage by an inmate or other individual. For instance, the electronic communication devices may be subject to physical forces beyond their designed operational force envelopes. For example, an inmate may utilize the electronic device as a projectile, impact the electronic device with an object, and/or otherwise subject the electronic device to a force that can cause temporary or permeant damage to the electronic device.

Accordingly, examples of the disclosure are directed to electronic device housings including deformation channels. As used herein, an electronic device housing refers to a rigid exterior member (REM) coupled to a semi-rigid interior member (SRIM) having deformation a channel between the REM and the SRIM. For example, electronic device housing can include a REM and a SRIM disposed within an internal volume of the REM, there SRIM including a cavity to house an electronic device, where the SRIM includes shock adsorbing spacers projecting from a main body of the SRIM to form a deformation channel between the REM and the main body of the SRIM.

Advantageously, electronic device housings including deformation channels can house an electronic device and permit electronic communications (e.g., between an inmate and a visitor) while mitigating or eliminating an ability of an inmate or other individual to damage the electronic device at least in part due to the presence of a deformation channel in the housing, as described herein. That is, the housings including a deformation channel permit physical access to an electronic device sufficient to use the electronic device as intended for electronic communications (e.g., electronic communication via an application installed on the electronic communication), while still mitigating or eliminating an ability of an inmate or other individual to damage the electronic device. For instance, an inmate or other individual can be permitted to access via an opening 103-2 in a REM to a graphical user interface (GUI) to permit use (e.g., conducting an electronic communication) of an electronic device housed in a housing including a deformation channel.

FIG. 1 illustrates an example of a 100 housing in accordance with the disclosure. As illustrated in FIG. 1, the housing 100 can include a REM 102 (illustrated in FIG. 1 is being opaque such that elements within REM are not visible) and a SRIM 104. In various examples, SRIM 104 and the REM 102 are separate and distinct components. For instance, the SRIM 104 can be formed of a unitary component including a main body with integral shock absorbing members projecting therefrom while the REM can be formed of at least two portions such as a first REM portion and a second REM portion, among other possibilities.

The REM 102 is formed of a rigid material. As used herein a rigid material refers to a material having a ShoreA hardness value of greater than 75 as measured by ASTM D2240-15 or other applicable ASTM. Examples of rigid material include a polypropylene, polycarbonate, thermoplastic polyurethane, a polyethylene terephthalate, a polybutylene terephthalate, a polyetherimide, a polyethersulfone, a polytrimethylene terephthalate, metal, alloy, stainless steels, nylons, various other hard plastics, iron, aluminum, lead, and/or combinations thereof, among other suitable materials having the same or similar mechanical properties as any one or more of those listed. In various examples the REM 102 can be formed of polypropylene, polycarbonate, and/or thermoplastic polyurethane. In some examples, the REM 102 can be formed of a polycarbonate. For instance, the REM 102 can be formed entirely of polycarbonate. The REM 102 can be formed of a material such as polycarbonate that is at least semi-transparent, in some examples. However, in some examples, the REM 102 can be formed of an opaque material that visually obscures a portion (e.g., a portion of a GUI) of an electronic device.

The REM 102 can be formed of two or more portions, as described herein. In any case, as illustrated in FIG. 1, the REM 102 has an internal volume within which the SRIM 104 can be disposed. That is, the REM 102 includes an internal volume (i.e., a second cavity) configured to receive and securely house the SRIM 104. For instance, the dimension of the second cavity can be substantially the same as dimensions of the SRIM 104 to reduce or eliminate a potential for an inmate or other individual to gain access inside of the REM 102 and/or promote shock absorption. Accordingly, when disposed within the internal volume, the SRIM 104 is in contact with at least three surfaces of the SRIM 104 at the same time. For instance, the SRIM 104 can be in contact with at six faces of the SRIM 104 at the same time when disposed within the internal volume of the REM 102. In this manner, a force applied to the REM 102 can be readily transferred into at least one corresponding surface of the SRIM 104.

As illustrated in FIG. 1, a portion of the SRIM 104 can be exposed to an environment surrounding the housing 104. Namely, a portion of the SRIM 104 can be accessible via an opening such as openings 103-1, 103-2, ..., 103-O. While FIG. 1 illustrates three openings, the housing 100 can have any suitable number of openings to permit direct access to an electronic device housed in housing 100 or indirect access to buttons, power/data input/outputs, etc. of the electronic device. For instance, a total number of opening can be varied depending upon an intended type/make/model of electronic device to be housed in the housing 100 to permit access to ports and/or buttons of the electronic device when housed in the housing 100. Notably, the at least some of the openings (e.g., openings 103-1, 103-O) are formed along an interface 109 between a first REM portion and a second REM portion. Such openings provide enhanced durability as compared to other devices relying on openings passing through and entirely encompassed by a single component.

As used herein, direct access to an electronic device housed in a housing refers to contact of the electronic device without intervening components such as the SRIM 104. As used herein, indirect access to an electronic device housed in a housing refers to contact of the electronic via an intervening component. For instance, indirect assess to an electronic device can include force applied to and passed through the SRIM 104 to a component (e.g., a button) of the electronic device housed in the housing 100. For instance, opening 103-1 can permit indirect access to a button of an electronic device as opening 103-1, as illustrated in FIG. 1. In contrast, openings 103-2 and 103-O can permit direct access. For instance, opening 103-O can permit coupling of a data/power cable to an electronic device housed in the housing 100 as it has a corresponding opening (211-1 illustrated in FIG. 2) in the SRIM 202.

The SRIM 104 is formed of a semi-rigid material. As used herein, as semi-rigid material refers to a material having a ShoreA hardness value of less than 60 as measured by ASTM D2240-15 or other applicable ASTM. Examples of semi-rigid materials include rubber, silicon rubber, thermoplastic elastomer (TPE), or combinations thereof among other suitable materials having the same or similar mechanical properties as any one or more of those listed. For instance, in some examples the SRIM 10 can be formed entirely of silicon rubber.

The SRIM 104 includes a cavity 105. The cavity 105 is configured to house an electronic device (not illustrated). The volume of the cavity 105 is substantially equal the dimensions (e.g., a height, depth, and/or width) of an electronic device to be housed in the cavity 105. For instance, a volume of the cavity 105 as defined by the SRIM 104 surrounding at least a portion of the cavity 105 can be substantially equal to a volume defined by each of the height, depth, and width of an electronic device to be housed in the cavity 105. That is, the dimensions of the cavity 105 can be varied (e.g., at a time of manufacture of the SRIM 104 or otherwise) such that the cavity 105 securely houses the electronic device. For instance, an electronic device is understood to be securely housed when the electronic device is in contact with at least three surfaces of the SRIM 104 to and preferably in contact with at least five surfaces of the SRIM 104 to limit or eliminate movement of the electronic device within the cavity once disposed in the cavity 105.

Notably, the housing 100 can be formed without an electronic device, as illustrated in FIG. 1. Stated differently, in at least some examples, the housing 100 can be configured to receive an electronic device but does not include an electronic device.

Figure 2:
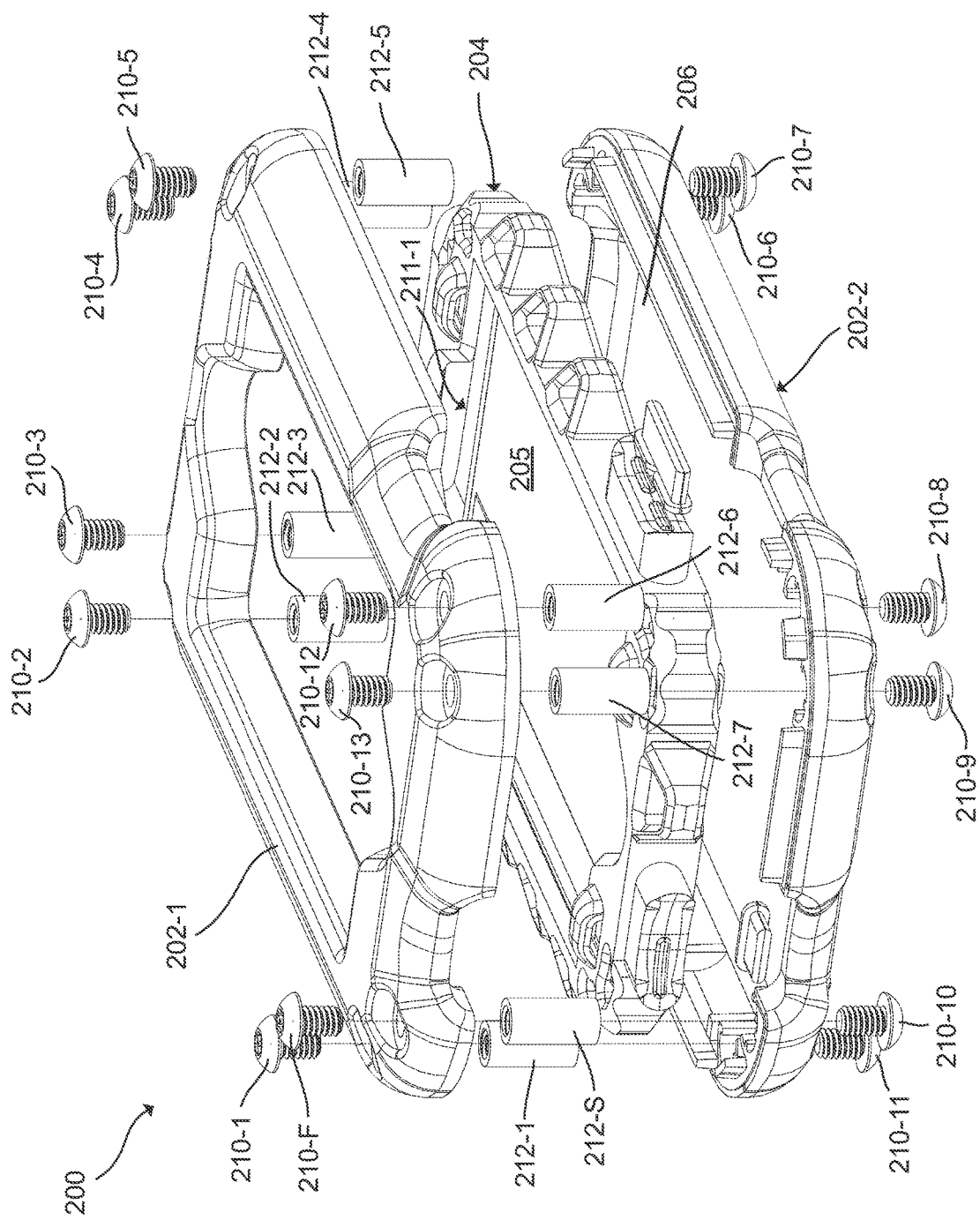
FIG. 2 illustrates an exploded view of the example of the housing of FIG. 1 in accordance with the disclosure.

FIG. 2 illustrates an exploded view of the example of the housing of FIG. 1 in accordance with the disclosure. The housing 200 includes a REM 202 comprised of a first REM portion 202-1 and a second REM portion 202-2. While illustrated in FIG. 2 as being formed of a total of two portions (202-1 and 202-1) it noted that the REM 202 can be formed by coupling together any number portions such as two or more REM portions.

The first REM portion 202-1 (i.e., the first REM) and the second REM portion 202-2 (i.e., the second REM) can each be formed of a rigid material, as described herein. The first REM portion 202-1 and the second REM portion 202-2 can be formed of the same or different respective rigid material. For instance, in some examples, each of the first REM portion 202-1 and the second REM portion 202-2 can be formed of a polycarbonate, among other possibilities.

As mentioned, the first REM portion 202-1 can be coupled to the second REM portion 202-2 to form the REM 202. For example, the first REM portion 202-1 can be coupled to the second REM portion 202-2 via mechanical fasteners. For example, the first REM portion 202-1 can be coupled to the second REM portion 202-2 via mechanical fasteners 210-1, 210-2, 210-3, 210-4, 210-5, 210-6, 210-7, 210-8, 210-9, 210-10, 210-11, 210-12, 210-13, ..., 210-F. While illustrated as a particular type and total number of mechanical fasteners it is understood that the type and/or the total number of mechanical fasteners can be altered to promote aspects of electronic device housings including a deformation channel, as described herein.

In some examples, the mechanical fasteners 210-1, ..., 210-F can be tamper proof mechanical fasteners. Examples of tamper proof mechanical fasteners include those commercially available under the tradename "TORX" from Tamperproof Screw Co. Inc. of New York, among other suitable types of tamper proof mechanical fasteners. Notably, in some examples, the housing 200 employs only tamperproof fasteners 210-1, . . . , 210-F to couple the first REM portion 202-1 to second REM portion 202-2. Stated differently, the first REM portion 202-1 can be coupled to the second REM portion 202-2 without typical mechanical fasteners (bolts, snap mechanisms, etc.) that can readily decoupled or dislodged by a typical object such as a coin.

In some examples, the housing 200 can include standoffs 212-1, 212-2, 212-3, 212-4, 212-5, 212-6, 212-7, . . . , 212-S. The standoffs 212-1, . . . 212-S can each be threaded and sized to receive a corresponding mechanical fastener of the 210-1, . . . mechanical fasteners 210-F. For instance, standoff 212-7 can receive mechanical fastener 210-13 and mechanical fastener 210-9 as illustrated in FIG. 2 and thereby couple the first REM portion 202-1 to second REM portion 202-2. As illustrated in FIG. 2, the standoffs can contact a periphery (e.g., an outside surface of the SRIM), however, in various examples, the tamper proof mechanical fasteners do not contact or pass through the SRIM, as described herein. Having the tamper proof mechanical fasteners external to the SRIM can extend a useable lifetime of the SRIM and/or promote improved shock absorption capability of the SRIM as compared to other devices that employ shock absorbing members which are mechanically fixed in a given position and therefore less readily absorb shock/deform.

While FIG. 2 illustrates a total of eight standoffs more of less standoffs can be utilized. Similarly, while FIG. 2 illustrates the standoffs 212-1, . . . 212-S as being separate and distinct components it is understood the standoffs 212-1, . . . 212-S can be integral with the first REM portion 202-1 and/or the second REM portion 202-2. The standoffs 212-1, . . . 212-S can be formed of metal, plastic such as polycarbonate, or other suitable material to promote aspects of electronic device housings including deformation channels.

As mentioned, the first REM portion 202-1 and the second REM portion 202-2 can form openings in the REM 202 when coupled together. Such openings (e.g., 103-1 and/or 103-O as illustrated in FIG. 1) can again be provide enhanced durability as compared to openings passing through and surrounded by a single component. Otherwise, the first REM portion 202-1 and the second REM portion 202-2 when coupled together form a barrier prohibiting access to portions to the SRIM 204 enclosed within the REM 202. Similarly, when an electronic device is disposed within a cavity 205 of the SRIM 204 the first REM portion 202-1 and the second REM portion 202-2 when coupled together form a barrier prohibiting access to portions to the electronic device other than portions of the SRIM 204 accessible via an opening (e.g., via openings 103-1, 103-2, 103-4) in the REM 202. That is the first and second REM are designed with tolerances (e.g., a few microns or less) there between (and between an electronic device housed in the housing). Such tolerances alone or in combination with indirect access afforded by at least some of the opening in the housing can mitigate and/or prevent an inmate or other individual from hiding contraband or other materials within an internal volume of the housing 200. The first REM portion 202-1 can have at least some dimensions (e.g., a height and/or a width) substantially equal to corresponding dimensions (e.g., a height and/or a width) of the second REM portion 202-2 such that when the first REM portion 202-1 is coupled to the second REM portion 202-2 there is a reduced a possibility of an inmate being about to decouple the first REM portion 202-1 from the second REM portion 202-2 as compared to other housings that have a protruding edge.

Figure 3:
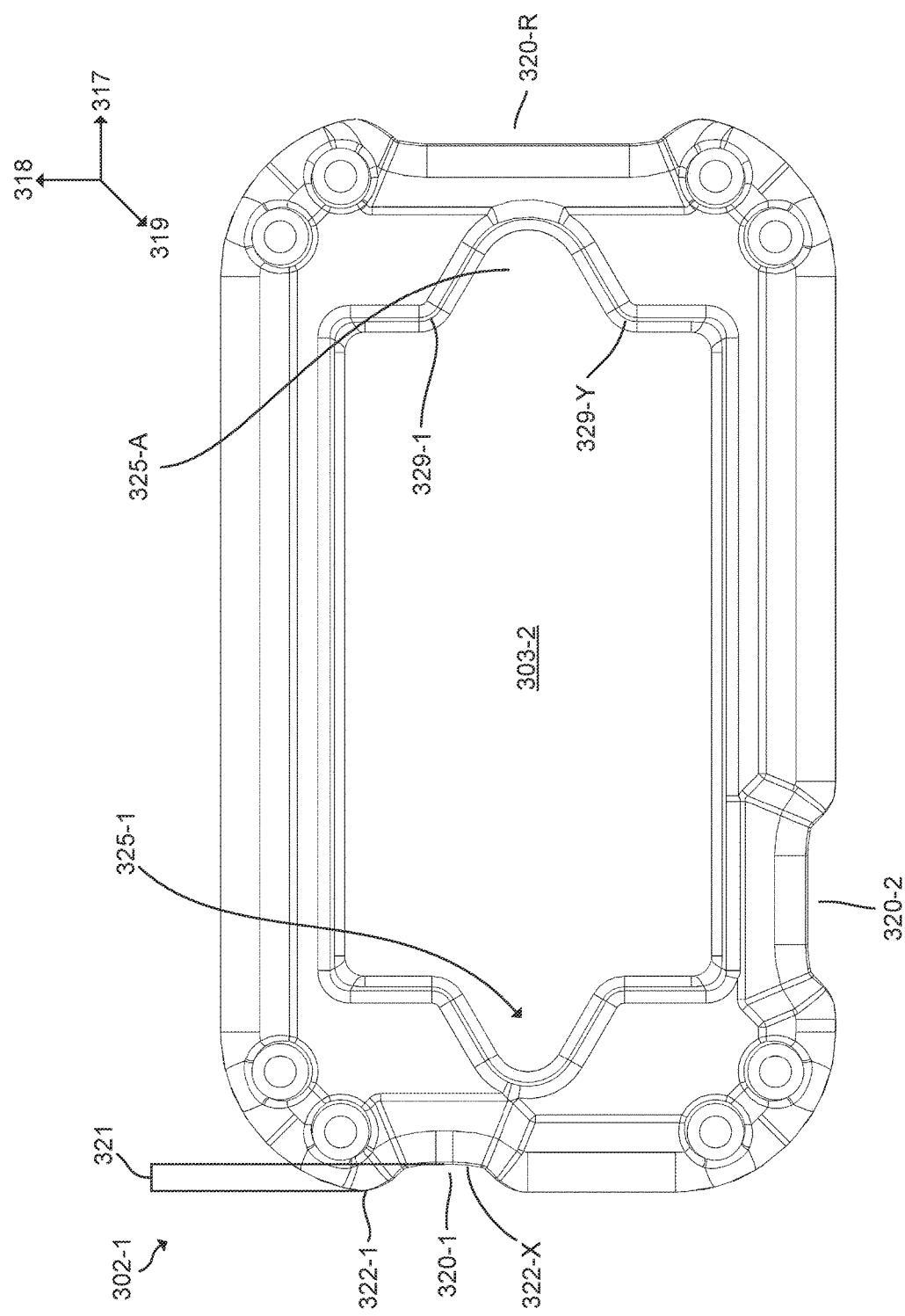
FIG. 3 illustrates a schematic top view of the example of a first rigid exterior member (REM) of FIG. 2 in accordance with the disclosure.

FIG. 3 illustrates a schematic top view of the example of the first REM of FIG. 2 in accordance with the disclosure. The first REM 302-1 can include recesses 320-1, 320-2, . . . , 320-R recessed along a first dimension 317, a second dimension 318, and a third dimension 319 in the first REM 302-1. That is, in various examples, the recess 320-1, 320-2, . . . , 320-R can be recessed in each of the first dimension 317, a second dimension 318, and a third dimension 319.

The recesses 320-1, . . . , 320-R can be at respective locations in the first REM 302-1 that correspond to openings (e.g., openings 103-1 and 103-O as illustrated in FIG. 1) in the first REM 302-1 and recesses, as described herein, in the second REM. In such examples, the recesses 320-1, . . . , 320-R can be recessed along the third dimension 319 such that the recesses 320-1, . . . , 320-R when combined with corresponding recesses in the second REM together form openings (such as those illustrated in FIG. 1) along an interface between the first REM 302-1 and the second REM.

The openings can be recessed a distance (e.g., distance 321) within the recesses 320-1, . . . , 320-R relative to other portions of the first REM 302 and/or the second REM. For example, a recess (e.g., recess 320-1) of the recesses can extend a distance 321 from 0.1 millimeters to 100 millimeters relative to other exterior portions 322-1, 322-X of the first REM 302-1 that are on an exterior surface of the REM 302-1 adjacent to the recess. The recess can be recessed in each of the dimensions 317, 318, 319 by the same distance or by respective amount(s) for each dimension of the dimensions 317, 318, 319 suitable to form to formed a recessed opening. Recessing of the openings can promote protection of an electronic device and/or SRIM accessible via the openings from damage as compared to other approaches employing openings that are not recessed.

In some examples, opening 303-2 can be substantially square and/or substantially rectangular without an alcove. However, as illustrated in FIG. 3, the opening 303-2 in the first REM 302-1 can include an alcove such as alcoves 325-1, . . . 325-A. Each of the alcoves can be extend a distance within a surface of the first REM 302-1 so the opening 303-2 permits access to buttons or an unabetted view to an environment outside of the housing from a camera in an electronic device disposed in the housing including the first REM 302-1. For instance, alcove 325-1 can permit an unabetted view of a camera while alcove 325-A can permit direct access to a button (e.g., a 'home' button), among other possibilities. An alcove (e.g., alcove 325-A) can extend a distance 328 from 10 millimeters to 150 millimeters relative to other portions 329-1, 329-Y of the first REM 302-1 that are adjacent to the alcove. While FIG. 3 illustrates the first REM 302-1 as including two alcoves the disclosure is not so limited. Rather, the first REM 302-1 can include fewer or more alcoves.

Figure 4:
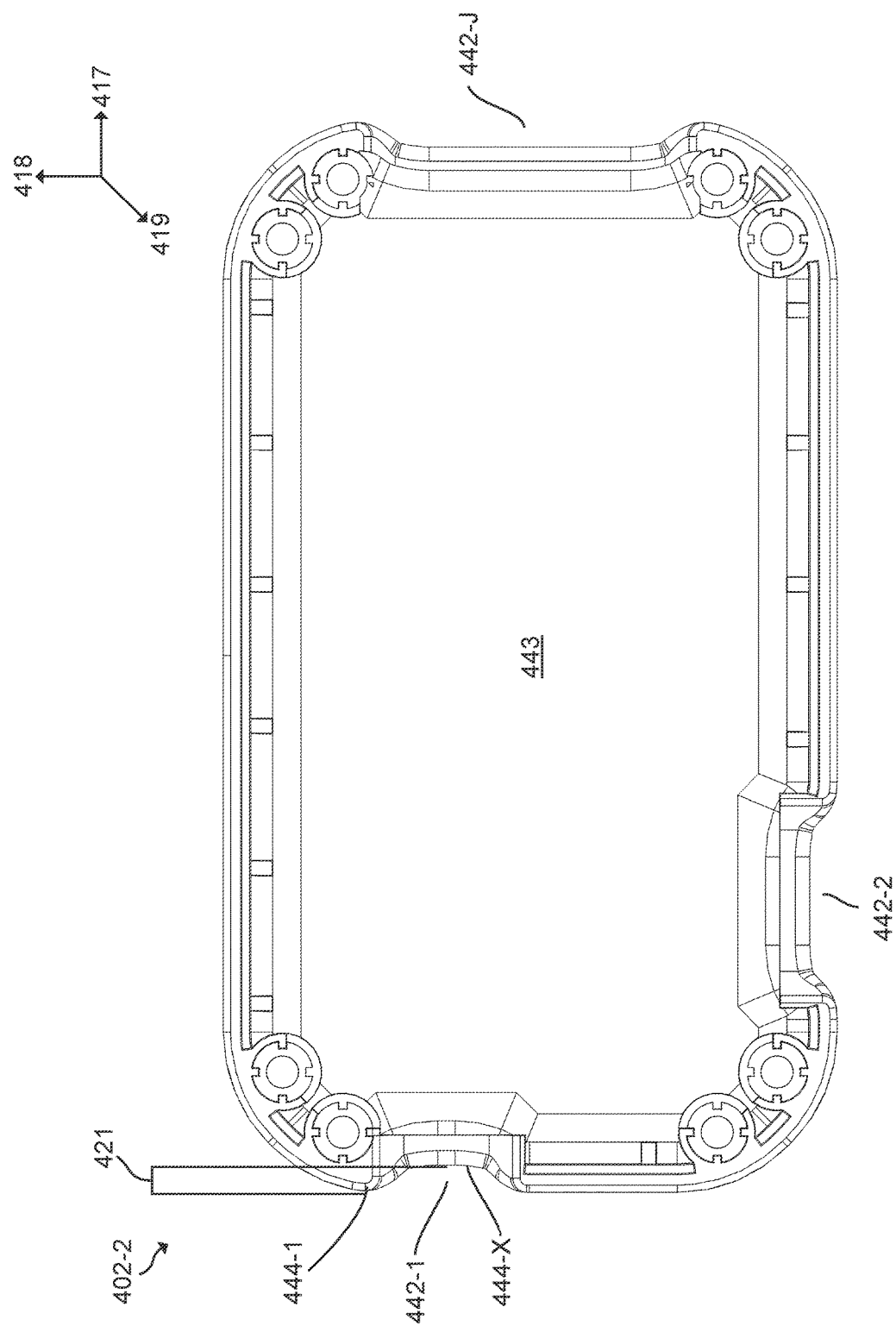
FIG. 4 illustrates a schematic bottom view of the example of the second REM of FIG. 2 in accordance with the disclosure.

FIG. 4 illustrates a schematic bottom view of the example of the second REM of FIG. 2 in accordance with the disclosure. As illustrated in FIG. 4, the second REM 402-2 can include recesses 442-1, 442-2, . . . , 442-J. The recesses 442-1, 442-2, . . . , 442-J can be recessed along a first dimension 417, a second dimension 418, and/or a third dimension 419 in the second REM 402-2. In various examples, the recesses 442-1, 442-2, . . . , 442-J can be recessed in each of the first dimension 417, a second dimension 418, and a third dimension 419. In such examples, the recesses 442-1, 442-2, . . . , 442-J can be recessed along the third dimension 419 so the recesses 442-1, 442-2, . . . , 442-J when combined with corresponding recesses in the first REM together form openings (such as those illustrated in FIG. 1) along an interface between the first REM and the second REM 402-2. In some examples, each of the recesses 442-1, 442-2, . . . 442-J in the second REM 402-2 can have a corresponding recess in the first REM.

In some examples, the recesses 442-1, 442-2, . . . , 442-J can be recessed a distance in the third dimension 419. The distance can be substantially equal to a distance of the corresponding recesses in the first REM. In such examples, the respective recesses of the first REM and the second REM can each form about half of a total diameter across an opening formed when the first REM is coupled to the second REM 402-2, among other possible relative dimensions.

The recesses 442-1, 442-2, . . . 442-J can be recessed a distance (e.g., distance 421) within the second REM 402-2. For example, a recess such as recess 442-1 of the recesses can along the first dimension 417 by a distance 421 from 0.1 millimeters to 100 millimeters relative to other exterior portions 444-1, 444-X of the second REM 402-2 adjacent to the recess. As used herein, for a given range it is understood that all individual values and sub-ranges are included the given range (e.g., 0.1 millimeters to 100 millimeters).

As illustrated in FIG. 4, in various examples, the second REM is without an opening in a bottom surface 443 (e.g., with respect to the third dimension) of the second REM 402-2. However, in some examples the second REM 402-2 can include an opening in the bottom surface 443.

Figure 5:
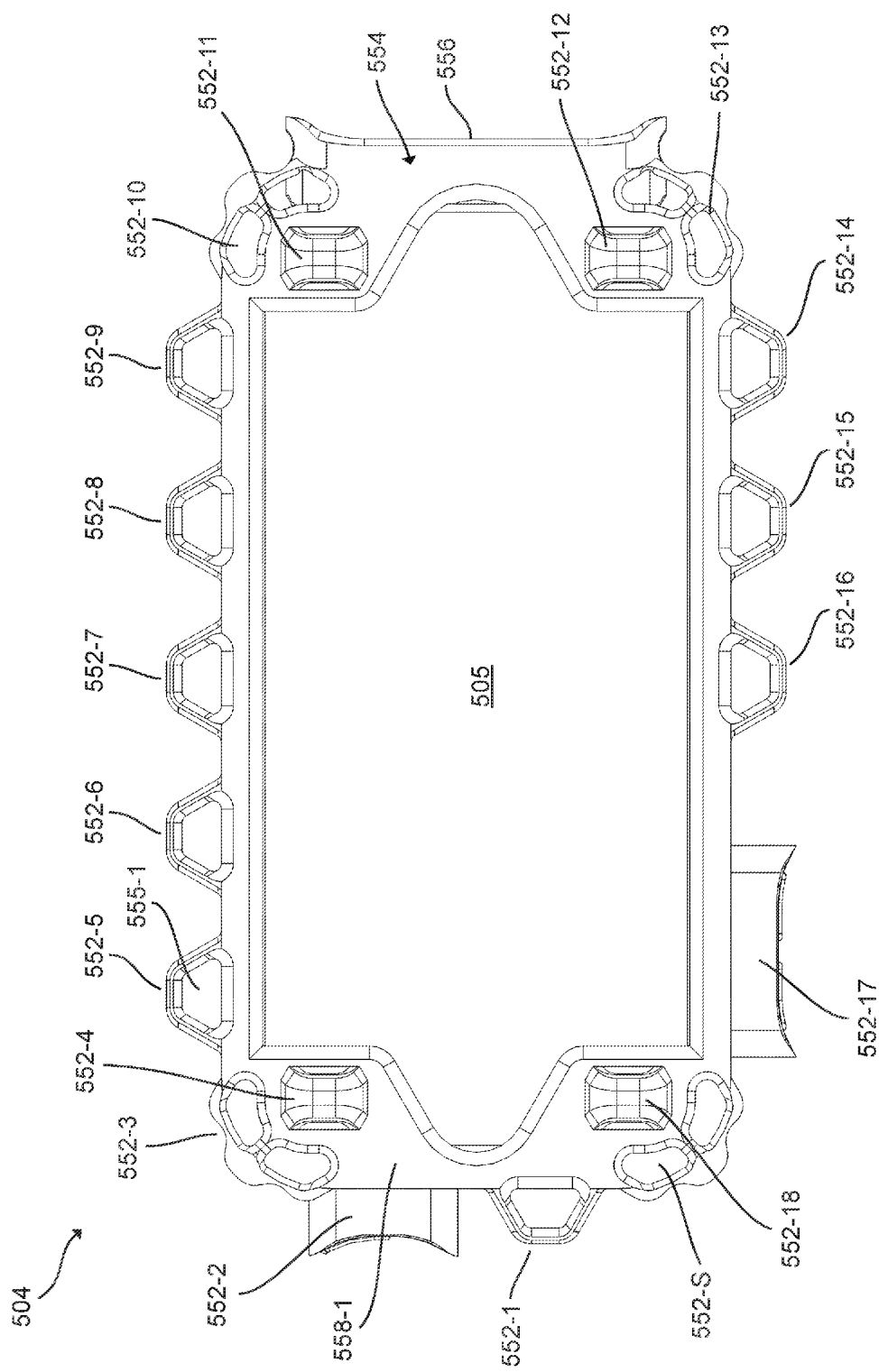
FIG. 5 illustrates a schematic top view of a semi-rigid interior member (SRIM) of FIG. 2 in accordance with the disclosure.

FIG. 5 illustrates a schematic top view of the SRIM of FIG. 2 in accordance with the disclosure. As illustrated in FIG. 5, the SRIM 504 can include shock adsorbing spacers 552-1, 552-2, 552-3, 552-4, 552-5, 552-6, 552-7, 552-8, 552 9, 552-10, 552-11, 552-12, 552-13, 552-14, 552-15, 552-16, 552-17, 552-18, . . . 552-S projecting from a main body 554 of the SRIM 504. As used herein, the 'main body' refers to a centralized portion of the SRIM from which the shock absorbing spacer projection. The 'main body' can include various surfaces, as described herein, from which respective shock absorbing spacers project.

In various examples, at least some of the shock absorbing spacers 552-1, . . . 552,S comprise hollow shock absorbing spacers. As used herein, a hollow shock absorbing spacer refers to a shock absorbing material having an opening that extends at least partially through a body of the spacer. For instance, as illustrated in FIG. 5, the SRIM 504 can include a hollow shock absorbing spacer in the form of shock absorbing spacer 552-1 including a hollow interior portion 555-1 extending entirely through the body of the shock absorbing spacer. Similarly, shock absorbing spacers 552-1, 552-3, 552-3, 552-4, 552-5, 552-6, 552-7, 552-8, 552-9, 552-10, 552-11, 552-12, 552-13, 552-14, 552-15, 552-16, 552-18 hollow shock absorbing spacers having respective openings (for ease of illustration not identified by respective element identifiers in FIG. 5) passing entirely through respective bodies of the same. Notably, a hollow shock absorbing spacer can provide enhanced shock absorption as compared to solid shock absorbing materials.

In some examples, 20 percent or less of the shock absorbing spacers can be formed of solid shock absorbing spacers that are not hollow. For instance, as illustrated in FIG. 5, shock absorbing spacers 552-2, 552-17 are solid shock absorbing spacers. Solid shock absorbing spacers can promote communication of a force from an exterior of a housing to a portion (e.g., a button such as a volume button) of an electronic device disposed in the housing.

In various examples, the shock absorbing spacers 552-1, . . . 552-S include a shock absorbing spacer (e.g., a hollow shock absorbing spacer) integral with the SRIM. As used herein, being integral refers to two elements formed of the same type of continuous material. For instance, as illustrated in illustrated in FIG. 5, each shock absorbing spacer the shock absorbing spacers 552-1, . . . 552-S can be an integral shock absorbing spacer. For instance, shock absorbing spacers 552-4, 552-11, 552-12, 552-18 are located on and integral with a top surface 558-1 of the main body 554 of the SRIM 504.

The SRIM 504 can include a cavity 505. The cavity 505 can be formed of a depression relative to the top surface 558-1 in a continuous material of the SRIM 504. The cavity 505 can be sized to securely house an electronic device.

The SRIM 504 can include a shock absorbing spacer configured to permit coupling of a cable to an electronic device disposed within the cavity 505. For instance, shock absorbing spacer 556 can be configured to permit a cable to be coupled to an electronic device disposed within the cavity 505 of the SRIM 504. The shock absorbing spacer 556 can include an opening (not shown in FIG. 5) to permit a portion of the cable to pass at least partially through the opening and a corresponding opening in the SRIM (e.g., opening 211-1) to couple to an electronic device disposed with the cavity 505.

Figure 6:
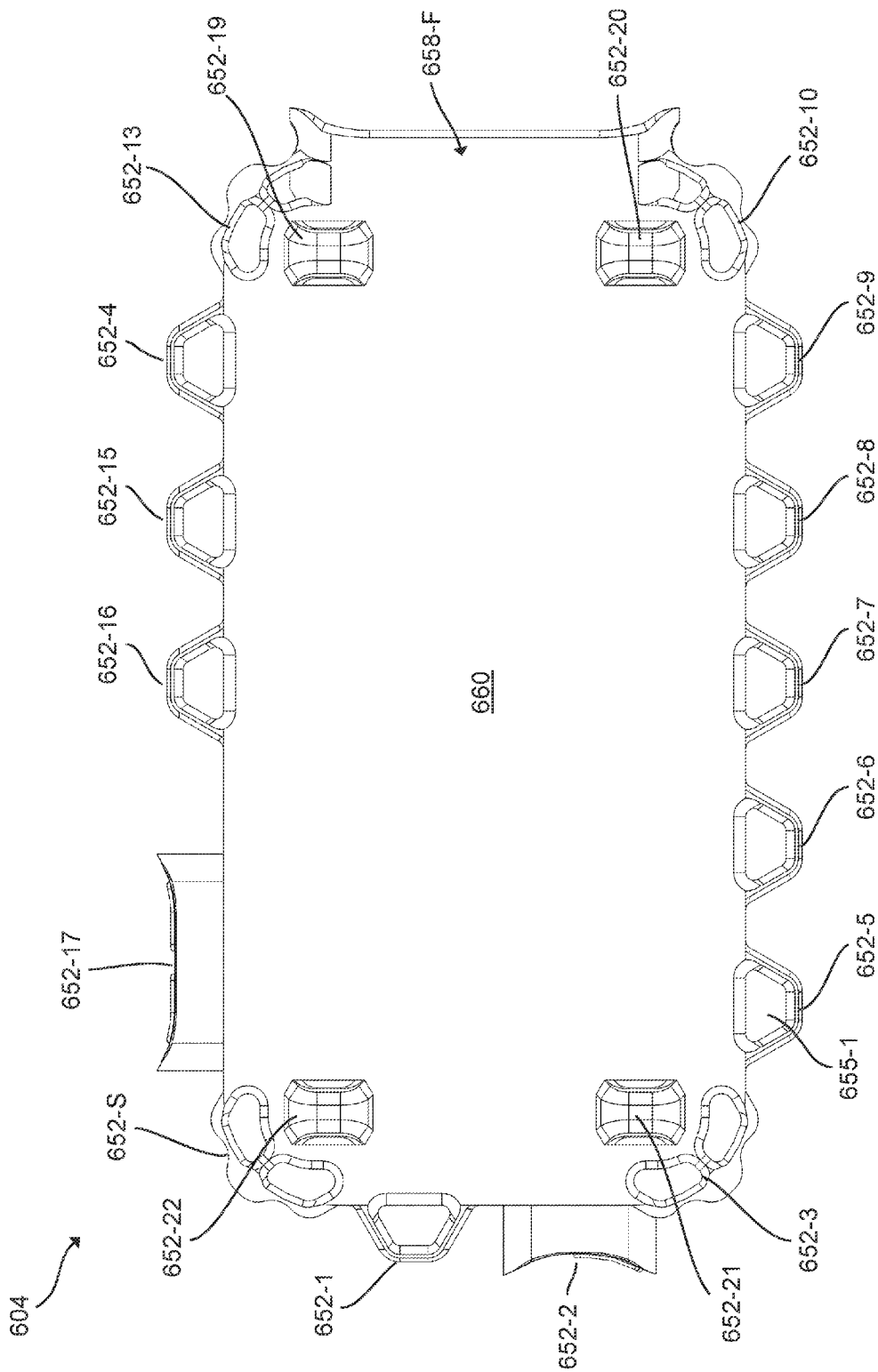
FIG. 6 illustrates a schematic bottom view of the SRIM of FIG. 2 in accordance with the disclosure.

FIG. 6 illustrates a schematic bottom view of the SRIM of FIG. 2 in accordance with the disclosure. As illustrated in FIG. 6, the SRIM 604 includes shock absorbing spacers 652-1, 652-2, 652-3, 652-5, 652-6, 652-7, 652-8, 652-9, 652-10, 652-13, 652-14, 652-15, 652-16, 652-17, 652-19, 652-20, 652-21, 652-22, . . . 652-S. For instance, shock absorbing spacers 652-19, 652-20, 652-21, 652-22 are located on and integral with a bottom surface of the SRIM 604. As mentioned, the shock absorbing spacers 652-1, . . . , 652-S can include hollow shock absorbing spacers. For instance, as illustrated in FIG. 6, shock absorbing spacer 652-5 is a hollow shock absorbing spacers having an opening 655-1 (analogous to opening 555-1).

As illustrated in FIG. 6, in various examples, the SRIM without an opening in the bottom surface 658-F. However, in some examples the SRIM 604 can include an opening in the bottom surface 658-F.

Figure 7:
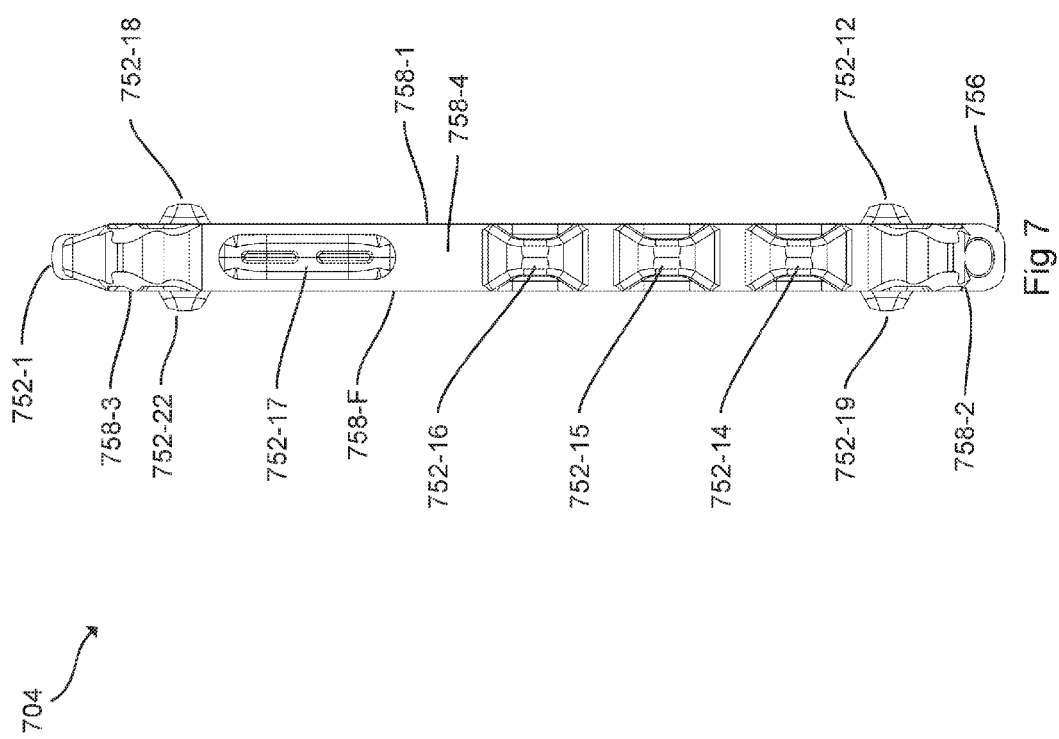
FIG. 7 illustrates a schematic profile view of the SRIM of FIG. 2 in accordance with the disclosure.

FIG. 7 illustrates a schematic profile view of the SRIM of FIG. 2 in accordance with the disclosure. In various examples, shock adsorbing spacers can be positioned various exterior surfaces of the SRIM 704. For example, shock absorbing spacers (e.g., hollow shock absorbing spacers) can be positioned on a top surface 758-1, a bottom surface 758-F, and at least two side surfaces 758-2, 758-3, 758-4 of the SRIM 704. As illustrated in FIG. 7, a first side surface 758-2 can have shock absorbing spacer 756 located thereon, a second side surface 758-3 can have can have shock absorbing spacer 752-1 located thereon, a third side surface 758-4 can have shock absorbing spacer 752-14, 752-15, 752-16, 752-17. Similarly, the top surface 758-1 (analogous to top surface 558-1) can of have shock absorbing spacers 752-18, 72-12 located thereon, while bottom surface (analogous to bottom surface 658-F) can have shock adsorbing spacers 752-22, 752-19 located thereon.

In some examples, the SRIM 704 can include a solid shock absorbing spacer such as 752-17. A solid shock absorbing spacer can be adjacent to an opening (e.g., opening 103-1 as illustrated in FIG. 1) in a housing. In this manner, a button of an electronic device disposed in the housing can be physically accessed via the opening and by transferring force via the solid shock absorbing member to the button.

In some examples, the SRIM 704 can include including a shock absorbing spacer positioned on each exterior surface of the SRIM 704. For instance, the SRIM 704 can include shock absorbing spacers on each surface of the six exterior surfaces 758-1, 758-2, 758-3, 758-4, 758-F, and a sixth surface (located on the opposite side of the SRIM 704 from surface 758-4) of the SRIM 704. In this manner, a housing including the SRIM 704 can provide enhanced (greater) shock absorption and/or shock absorption independent of a direction of a force applied to the housing in contrast to other approaches without shock adsorbing spacers on each exterior surface of a component including a cavity in which an electronic device can be housed.

Figure 8:
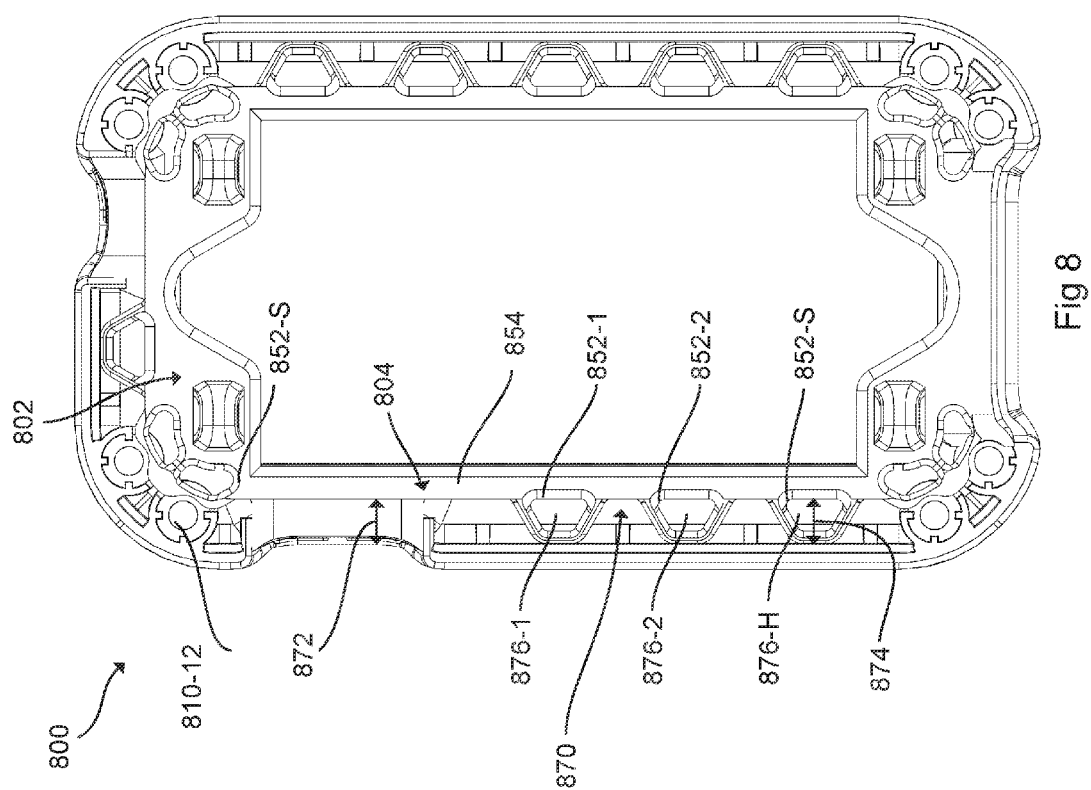
FIG. 8 illustrates a top view of a deformation channel of the housing of FIG. 1 in accordance with the disclosure.

FIG. 8 illustrates a top view of a deformation channel of the housing of FIG. 1 in accordance with the disclosure. As illustrated in FIG. 8, the housing 800 can include a deformation channel 870 within REM 802.

As used herein, a deformation channel refers to a volume within and defined at least in part by a REM, where at least a portion of the volume includes shock absorbing spacers. For instance, as illustrated in FIG. 8, the deformation channel 870 can be comprised of a volume (e.g., an air-filled portion) within and defined by the REM 802 (comprised of the first REM and the second REM, as described herein) and including the shock absorbing spacers 852-14, 852-15, . . . 852-16 extending from a main body 854 of the SRIM 804 into the volume of the deformation channel. The deformation channel 870 can surround at least 90 percent of a perimeter of the SRIM 804. For instance, the deformation channel 870 can extend around an entire perimeter of the SRIM 804, in some examples. For instance, the deformation channel can a single deformation channel having be a volume (between the REM and the main body 554 of the SRIM 804) that extends around the entire perimeter of the SRIM 804.

The shock absorbing spacers 852-14, 852-15, . . . 852-16 are analogous to shock absorbing spacers described and illustrated herein (e.g., 552-1, . . . , 552-S); however, for ease of illustration are illustrated as the three shock absorbing spacers 852-14, 852-15, . . . 852-16 in FIG. 8. As illustrated in FIG. 8, the shock absorbing spacers 852-14, 852-15, . . . 852-16 can be hollow shock absorbing spacers including a respective opening 876-1, 876-2, . . . 876-H passing therethrough, among other possibilities at least some of the shock absorbing spacers being solid. In such examples, a volume of the deformation channel can encompass a volume of an opening (e.g., 876-1, etc.) included in the hollow shock absorbing spacers. In various examples, the shock absorbing spacers 852-14, 852-15, . . . 852-16 extend a distance 874 substantially equal to an entire distance 872 across the volume 870 between the SRIM 804 and the REM 802 (illustrated in FIG. 8 as being transparent to permit view of various elements within REM 802). However, some shock absorbing spacers (e.g., 852-S) such as those on the corners of the housing 800 can extend a distance from the main body 854 of the SRIM 804 to contact an outside surface of a standoff (not shown) including a mechanical fastener 810-12. Regardless, having such shock absorbing spacers extending a distance to the REM and/or the standoff can desirably promote absorption of forces applied to the REM 802 while reducing an amount of the force translated to an electronic device (not shown) disposed in a cavity of the SRIM 804.

While FIG. 8 provides a top view of the housing 800 including deformation channel 870 it is understood the deformation channel surrounds at least four surfaces of the SRIM, and preferably six surfaces (four side surfaces, the top, and the bottom surface) of the SRIM 804. As mentioned, the having tamper proof mechanical fasteners (e.g., tamper proof mechanical fastener 810-12) external to the SRIM 804, as illustrated in FIG. 8, can extend a useable lifetime of the SRIM and/or promote improved shock absorption capability of the SRIM as compared to other devices that employ shock absorbing members which are mechanically fixed in a given position and therefore less readily absorb shock/deform.

Figure 9:
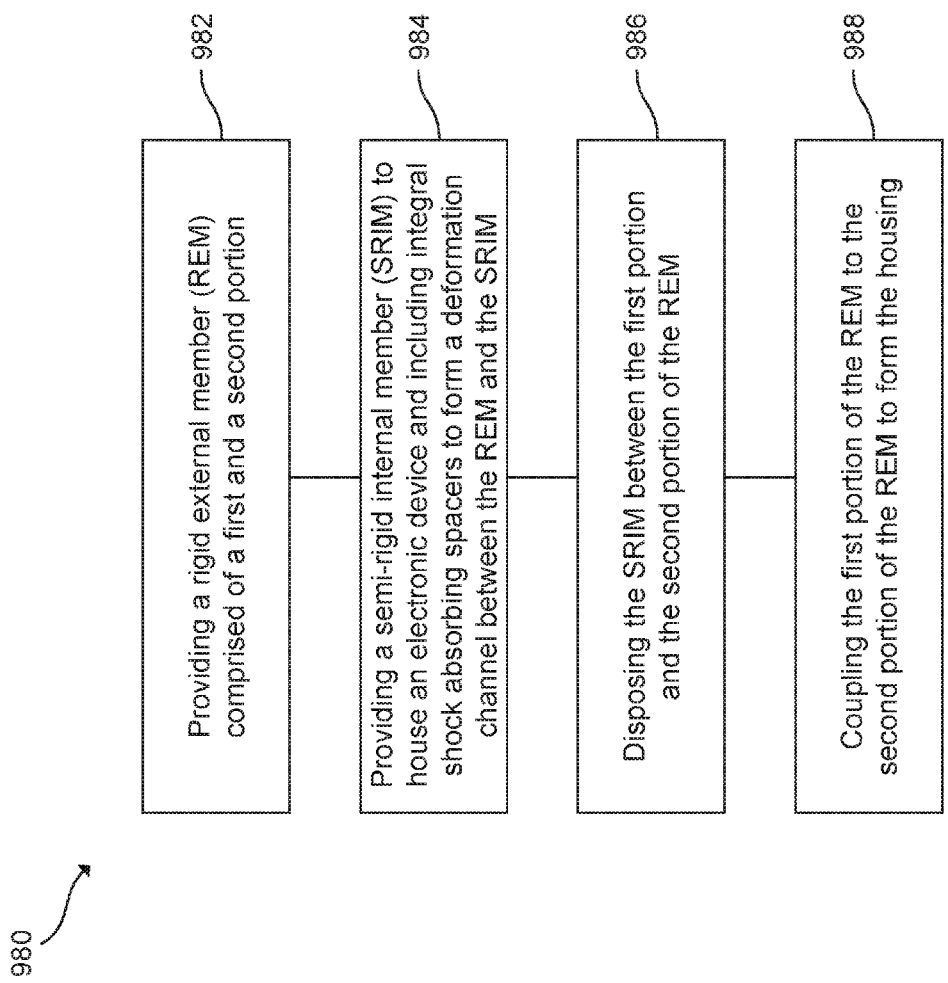
FIG. 9 illustrates a flow diagram of an example of a method of forming a housing in accordance with the disclosure.

FIG. 9 illustrates a flow diagram of an example of a method 980 of forming a housing in accordance with the disclosure. As illustrated in FIG. 9, the method 980 can include providing a REM comprised of a first portion and a second portion and providing a SRIM to house an electronic device and including integral shock adsorbing spacers to form a deformation channel between the REM and the SRIM, as illustrated at 982, and 984, respectively. As used herein, providing refers to manufacture or otherwise procuring an object such as the REM (e.g., the first REM and/or the second REM) and/or the SRIM. As mentioned, the REM and/or the SRIM can be sized to promote housing of a particular type, make, and/or model of electronic device within the SRIM when the SRIM is disposed in the REM.

As illustrated at 986, the method 980 can include disposing the SRIM between the first portion and the second portion of the REM. Disposing refers to positioning the SRIM at least partially within the REM. For example, the SRIM can be disposed in the second portion of the REM and the first portion of the REM can be positioned adjacent to the second portion of the REM having the SRIM disposed therein. As used herein, being adjacent refers to an element (e.g., a first REM portion) being in physical contact with another element (e.g., a second REM portion) and/or being otherwise arranged in a manner to promote other aspects herein (e.g., coupling the first portion of the REM to the second portion of the REM to form the housing). The SRIM can be disposed such that the SRIM is physically accessible only at portions adjacent to an opening (e.g., opening 103-1 as illustrated in FIG. 1) in the REM when the first portion of the REM is coupled to the second portion of the REM.

That is, as illustrated at 988, the method 980 can include coupling the first portion of the REM to the second portion of the REM to form the housing. For instance, the method 980 can include coupling the first portion of the REM to the second portion of the REM to form the housing in response to disposing the SRIM between the first portion and the second portion of the REM, at 986. As mentioned, the first portion of the REM can be coupled to the second portion of the REM via tamper proof mechanical fasteners, among other possibilities. For examples, a housing can be formed, in various examples, by the combination of a standoff and two screws including a first screw passing through the first REM portion and a second screw passing through the second REM portion to couple the first to a base by two pivot screws and two bushings (one bushing for each pivot screw), among other possibilities.

In some examples, the method 980 can include providing an electronic device and disposing the electronic communication device within the cavity prior to disposing the SRIM between the first portion and the second portion of the REM, as 986. In this manner, the electronic device can be securely housed within the housing formed of the SRIM and the first and second portions of the REM while permitting electronic communications though use of the communication device disposed in the housing.

Figure 10:
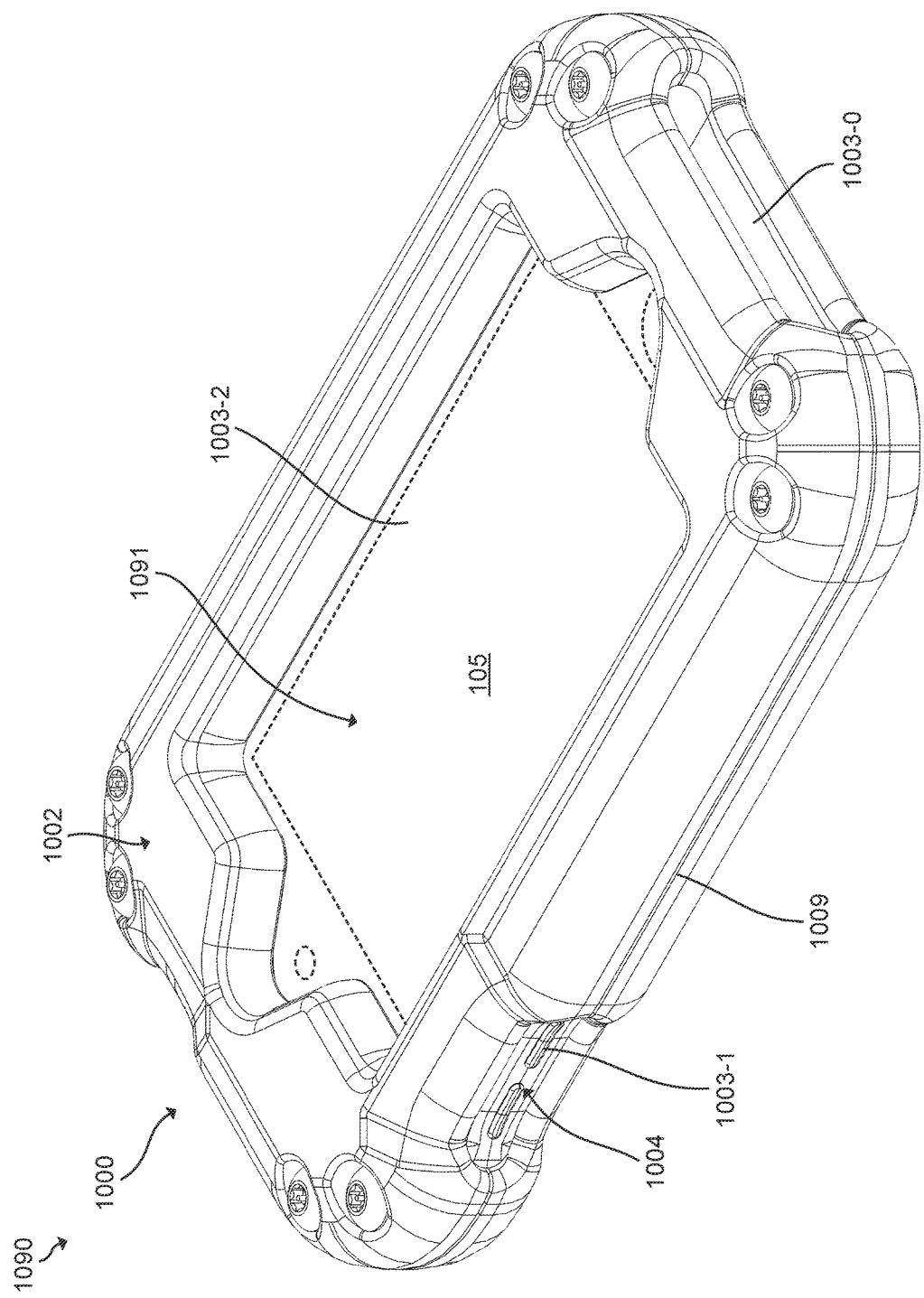
FIG. 10 illustrates an example of a system in accordance with the disclosure.

FIG. 10 illustrates an example of a system 1090 in accordance with the disclosure. As illustrated in FIG. 10, they system 1090 can include an electronic device 1091 and a housing 1092. The electronic device 1091 can have a front surface, a back surface, and side surfaces (not shown for ease of illustration).

The housing can include a REM 1002 and SRIM 1004. The SRIM 1004 can define a cavity 1005 to house the electronic device 1091 and surround at least the back and the side surfaces of the electronic device 1091 as illustrated in FIG. 10 such that at least a portion of the front surface of the electronic device is accessible.

As mentioned, the REM 1002 includes an opening 1003-2 to permit direct physical access to a portion of the electronic device 1091 is housed within a cavity of the SRIM 1004. In various examples, the electronic device 1091 can be a tablet, a mobile phone, and/or a laptop computer. Stated differently, in various examples the electronic device 1091 can be a tablet, mobile phone, laptop computer, or a combination thereof.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2.

In the detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

As will be appreciated, elements shown in the various examples herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. As used herein, "a number of" an element and/or feature can refer to a number of such elements and/or features. In addition, "for example" and similar phrasing is intended to mean, "by way of example and not by way of limitation". It is understood that when an element is referred to as being "on," "connected to", "coupled to", or "coupled with" another element, it can be directly on, connected to, or coupled with the other element or intervening elements may be present. As used herein, "top", "bottom" and "side" are relative terms and intended merely convey relative orientations of elements in a given Figure/examples and it is understood that examples are not limited to a given relative orientation.

The specification examples provide a description of the applications and use of the system and method of the disclosure. Since many examples can be made without departing from the spirit and scope of the system and method of the disclosure, this specification sets forth some of the many possible example configurations and implementations.

What is claimed:

1. A housing, comprising:
a rigid exterior member (REM); and
a semi-rigid interior member (SRIM) disposed within an internal volume of the REM and including a cavity to house an electronic device, wherein the SRIM includes shock absorbing spacers projecting from a main body of the SRIM to form a deformation channel between the REM and the main body of the SRIM, wherein the REM is formed of at least two portions that are coupled via tamper proof mechanical fasteners to form the REM.

2. The housing of claim 1, wherein the shock absorbing spacers comprise hollow shock absorbing spacers.

3. The housing of claim 2, wherein the hollow shock absorbing spacers include an opening extending through at least one exterior surface of the hollow shock absorbing spacers.

4. The housing of claim 1, wherein the shock absorbing spacers including a shock absorbing spacer positioned on each exterior surface of the SRIM.

5. The housing of claim 1, wherein the deformation channel extends a distance between the REM and the SRIM that is substantially equal to a diameter of a respective shock absorbing spacer of the shock absorbing spacers.

6. The housing of claim 1, wherein the shock absorbing spacers include a hollow shock absorbing spacer integral with the SRIM.

7. The housing of claim 1, wherein the REM comprises a rigid material having a ShoreA hardness value of greater than 75, and wherein the SRIM comprises a semi-rigid material having a ShoreA hardness value of less than 60.

8. The housing of claim 7, wherein the rigid material further comprises a polyurethane, and wherein the semi-rigid material further comprises rubber, silicon rubber, thermoplastic elastomer (TPE), or combinations thereof.

9. The housing of claim 1, wherein the SRIM and the REM are separate and distinct, and wherein the SRIM is a unitary component.

10. The housing of claim 9, wherein housing include standoffs, wherein the standoffs are to contact a periphery of the SRIM, and wherein the tamper proof mechanical fasteners do not contact or pass through the SRIM.

11. The housing of claim 10, wherein a volume of the cavity is substantially equal the dimensions of a housing of the electronic device such that the cavity securely houses the electronic device.

12. A system, comprising:
an electronic device having a front surface, a back surface, and side surfaces; and
a housing including:
a rigid external member (REM), wherein the REM is formed of at least two portions that are coupled via tamper proof mechanical fasteners to form the REM; and
a semi-rigid internal member (SRIM) defining a cavity to house the electronic device and surround at least the back and the side surfaces of the electronic device, and wherein the SRIM includes hollow shock absorbing spacers projecting from a main body of the SRIM to form a deformation channel between the REM and the main body of the SRIM.

13. The system of claim 12, wherein the REM includes an opening to permit direct physical access to a portion of the electronic device when the electronic device is housed within the cavity of the SRIM.

14. The system of claim 13, wherein the REM includes an opening adjacent to a solid shock absorbing spacer to permit access to the SRIM.

15. The system of claim 12, wherein the electronic device is selected from a group including a tablet, a mobile phone, a laptop computer, or a combination thereof.

16. The system of claim 13, wherein the REM defines a second cavity to house the SRIM, wherein the dimension of the second cavity are substantially the same as dimensions of the SRIM.

17. The system of claim 12, wherein the hollow shock absorbing spacers are positioned on a top surface, a bottom surface, and at least two side surfaces of the SRIM.

18. A method of manufacture of a housing, comprising:
providing a rigid external member (REM) comprised of a first portion and a second portion, wherein the first portion and the second portion are coupled via tamper proof mechanical fasteners to form the REM;
providing a semi-rigid internal member (SRIM) to house an electronic device and including integral shock absorbing spacers to form a deformation channel between the REM and the SRIM;
disposing the SRIM between the first portion and the second portion of the REM; and
coupling the first portion of the REM to the second portion of the REM to form the housing.

19. The method of claim 18, further comprising providing an electronic device, and housing the electronic device in the SRIM prior to disposing the SRIM between the first portion and the second portion of the REM.

20. The housing of claim 1, wherein the deformation channel has a volume between the REM and the main body of the SRIM that extends around the entire perimeter of the SRIM.

\* \* \* \* \*